(12) United States Patent
Robbins et al.

(10) Patent No.: US 6,783,031 B2
(45) Date of Patent: Aug. 31, 2004

(54) TWO-PIECE MEASURING DISPENSING CAP

(75) Inventors: Edward S. Robbins, Muscle Shoals, AL (US); John J. Miller, Muscle Shoals, AL (US); Ronald R. White, Florence, AL (US)

(73) Assignee: Edward S. Robbins, III, Muscle Shoals, AL (US)

( * ) Notice: Subject to any disclaimer, the term of this patent is extended or adjusted under 35 U.S.C. 154(b) by 128 days.

(21) Appl. No.: 10/244,909

(22) Filed: Sep. 16, 2002

(65) Prior Publication Data

US 2004/0050882 A1 Mar. 18, 2004

(51) Int. Cl.[7] ................................................. B67D 5/16
(52) U.S. Cl. ........................ 222/111; 222/442; 222/452; 222/556
(58) Field of Search ................................. 222/111, 442, 222/450, 451, 452, 556

(56) References Cited

U.S. PATENT DOCUMENTS

| 3,005,578 | A | * | 10/1961 | Mainicri ..................... 222/450 |
| 3,006,506 | A | * | 10/1961 | Germano ..................... 222/450 |
| 3,223,296 | A | * | 12/1965 | Waddington et al. ....... 222/452 |
| 4,807,785 | A |   | 2/1989  | Pritchett |
| 5,020,699 | A |   | 6/1991  | Sams |
| 5,782,388 | A | * | 7/1998  | De Nervo .................... 222/556 |
| 5,855,299 | A | * | 1/1999  | Arnold et al. .............. 222/571 |
| 6,041,979 | A |   | 3/2000  | Robbins, III et al. |

FOREIGN PATENT DOCUMENTS

FR 2593143 A1 * 7/1987 ........... G01F/11/26

* cited by examiner

Primary Examiner—Kenneth Bomberg
(74) Attorney, Agent, or Firm—Brinks Hofer Gilson Lione

(57) ABSTRACT

A two-piece dispensing cap for a container has a body and an insert mounted for rotation within the body. The body has a sidewall defining a cylindrical chamber with an open first end and an end wall forming a partially closed second end. The body sidewall has an inlet while the body end wall has an axial opening, a non-axial outlet, and a protruding flange for attachment to a container mouth. The insert is received into open first end of the cylindrical chamber. The insert has a peripheral wall dimensioned to conform to the cylindrical housing interior surface and a first insert end wall including a protruding handle extending through the axial opening in the body end wall. The insert includes openings to permit filling of the insert from the container and dispensing of the contents of the insert. An insert second end wall is integrally formed with a hinge to the insert peripheral wall while an over-cap is integrally formed with a hinge to the body portion.

20 Claims, 5 Drawing Sheets

TWO-PIECE MEASURING DISPENSING CAP

BACKGROUND OF THE INVENTION

1. Field of the Invention

The present invention generally relates to caps for containers usable for storage and dispensing of liquids and particulate solids, and more particularly concerns caps of the type that are capable of dispensing a stored liquid or particulate solid in a measured amount that may be selected by the user without removal from the container.

2. Description of the Prior Art

There are presently available a number of caps for containers that may be used to store liquids, such as detergents, and particulate solids. In addition, available caps may be capable of use for dispensing a measured portion of the liquid or particulate solid, by removal of the cap from the container, pouring the desired amount of liquid or particulate solid into the cap while disposed in an inverted position, and then pouring the liquid or particulate solid from the cap.

More recently, measuring dispensing caps have been developed that are capable of conveniently dispensing a measured portion of a liquid or particulate solid from a container without removal of the cap from the container, with the volume of material to be dispensed selected by the user to be any volume up to a maximum volume, and simultaneously preventing the remaining stored material from being dispensed or spilled during the dispensing operation. Examples are to be found in U.S. Pat. Nos. 5,020,699; and 6,041,979.

The known measuring dispensing caps are often formed from the assembly of several constituent parts that are each separately molded and require substantial time for assembly. Further, the known measuring dispensing caps often omit any over-cap that might inhibit tampering with the contents of the container prior to purchase and protect the measuring dispensing portions of the cap.

SUMMARY OF THE INVENTION

A measuring dispensing cap of the present invention is formed from merely two pieces that are telescopically received into a nesting relationship that permits the movement of one piece relative to the other to achieve the measuring and dispensing functions of the cap. The cap has a body including a sidewall defining a cylindrical chamber having an open first end. The body also has an end wall coupled to the body sidewall that defines a partially closed second end of the chamber. The body end wall includes an axial opening and a non-axial opening. The cap also has a protruding flange portion that is adapted for attachment to a mouth of a container that provides an opening into the container interior. The body also includes an aperture in the housing sidewall through which material can flow from the container into the measuring dispensing cap. The body preferably also includes an integral over-cap that is coupled to the body for movement between an open position, permitting material to be dispensed through the body end wall non-axial opening, and a closed position covering the body end wall.

A measuring dispensing cap of the present invention also includes an insert telescopically received into open first end of the cylindrical chamber. The insert has a peripheral wall portion specifically dimensioned to conform to the cylindrical housing interior surface so as to permit rotation of the insert within the housing. A first insert end wall coupled to the peripheral wall portion includes a protruding portion extending through the axial opening in the body end wall. An aperture is provided in the insert peripheral wall portion for alignment with the body sidewall aperture to permit the interior of the insert to be filled with material from the container to which the measuring dispensing cap is connected. The first insert end wall also includes a non-axial opening positioned for alignment with the body non-axial opening only when the insert is suitably positioned with respect to the body to permit dispensing of any material from within the insert. A second insert end wall is coupled to the insert peripheral wall portion opposite the insert first insert end wall. The second insert end wall is preferably integrally molded with the remainder of the insert to minimize assembly. The integral assembly can be in the form of an integral hinge portion that permits the displacement of the second insert end wall from an initial molded position to a closed position coupling the second insert end wall to the perimeter of the insert peripheral wall portion.

The body of a measuring dispensing cap of the present invention generally includes an integral hinge coupling the over-cap to a side point on the cap, preferably to the body flange portion. Further, the flange includes a collar portion that has an interior surface having coupling elements for coupling the body to a container opening. The coupling elements can be in the form of an inwardly extending screw thread for cooperative engagement with a similar thread included on a finish portion of the container mouth. The coupling elements can also take the form of a bayonet coupling or similar tang structure for engagement with a suitably formed container mouth. The axial opening in the body end wall includes preferably includes an inwardly projecting ridge than can engage the insert portion of the cap to retain the insert in a fully nested position, yet permit the insert to be rotated within the body portion to effect the filling and dispensing operation of the cap. The protruding axial portion of the insert preferably includes an outwardly projecting rim that can engage the inwardly projecting ridge in the axial opening of the body end wall. During assembly the cooperative engagement of the projecting rim and ridge typically will cause an audible sound signifying the completed assembly of the two elements together.

Once assembled, the insert can be manually rotated with respect to the body portion to a first position wherein the insert peripheral wall opening is aligned with the body sidewall aperture to permit the interior of the insert to be filled with material from the container to which the measuring dispensing cap is connected. Preferably the end walls of the body and insert are sufficiently transparent so that the filling operation can be viewed through the end walls of the body and insert. When the interior of the insert is sufficiently filled, the insert can be rotated to a second position wherein the non-axial openings in the end walls of the insert and body portion are aligned, thus permitting the contents of the insert to be dispensed. Finally, the insert can be rotated to a third position where neither set of openings is aligned so that the contents of the container can be sealed. A further seal can be achieved by moving the over-cap into position over the end walls of the body and insert portions.

One feature of the present invention is the integral over-cap that has the advantage of being moldable simultaneously with the body portion. This integral molding eliminates separate handling of the over-cap and provides an increased measure of protection for the dispensing mechanism during filling, assembly and transport of a container on which the invention is used. After purchase by the ultimate consumer, the integral over-cap can be easily separated, if desired, from the remainder of the body by severing the joining hinge to form a convenient conveyance of the material dispensed from the container to the point of use.

Another feature of the present invention is the integral second insert end wall that has the advantage of being integrally coupled to the insert peripheral wall portion. This integral molding again eliminates separate handling of the second insert end wall and ensures similar molding conditions for the mating portions of the insert second end wall and insert peripheral wall, which increases conformity of the mating portions during initial assembly, and similar aging characteristics during use by the ultimate consumer.

Other features and advantages of the present invention will become apparent to those skilled in the art from the following disclosure of a preferred embodiment of the present invention exemplifying the best mode of the invention. The following disclosure references the accompanying drawings illustrating the preferred embodiment.

DESCRIPTION OF A PREFERRED EMBODIMENT

Figure 1:
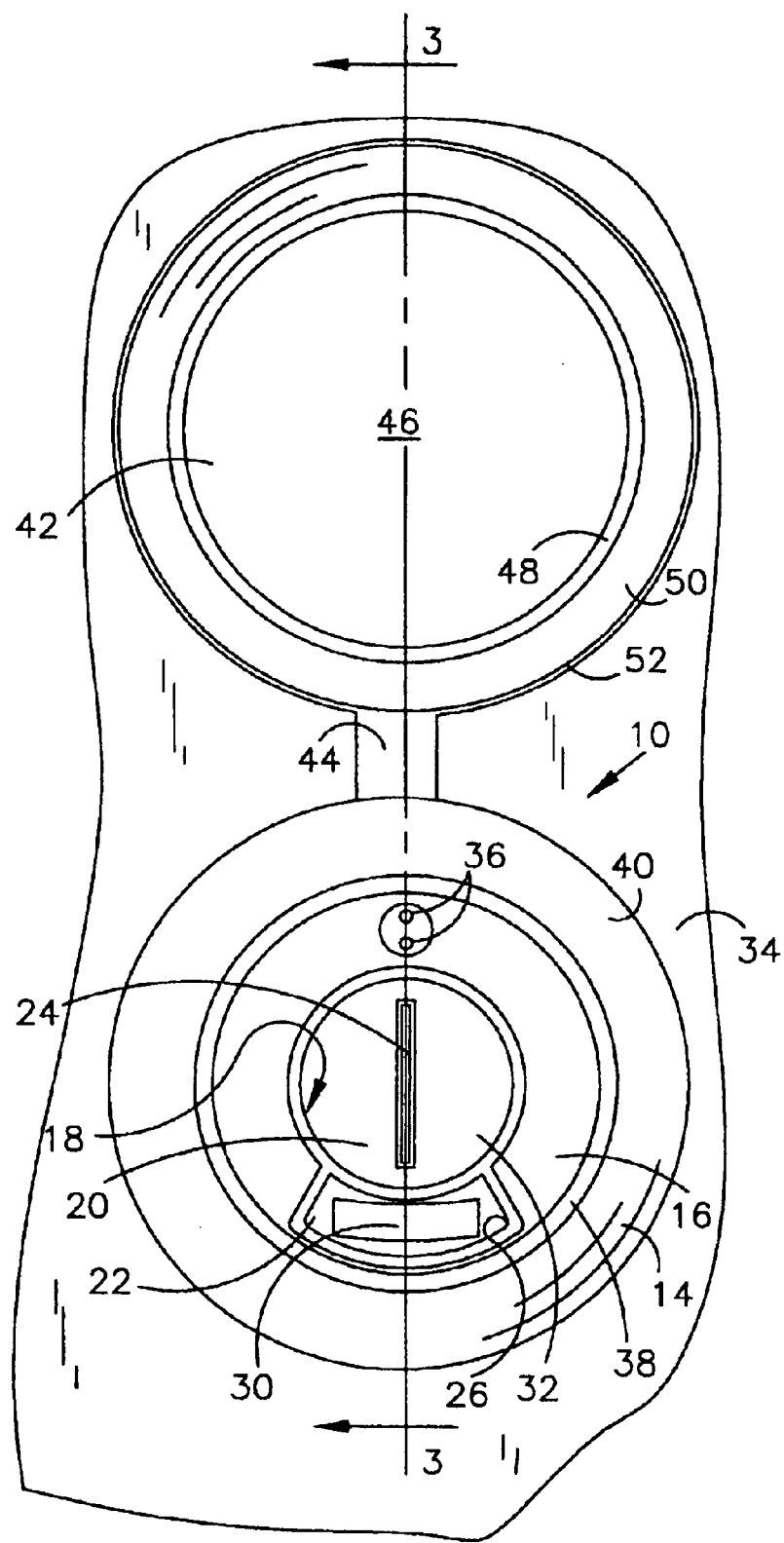
FIG. 1 is front elevation view of a dispensing cap of the present invention with the over-cap in a fully opened position and the non-axial openings aligned to permit dispensing of contents.
Figure 2:
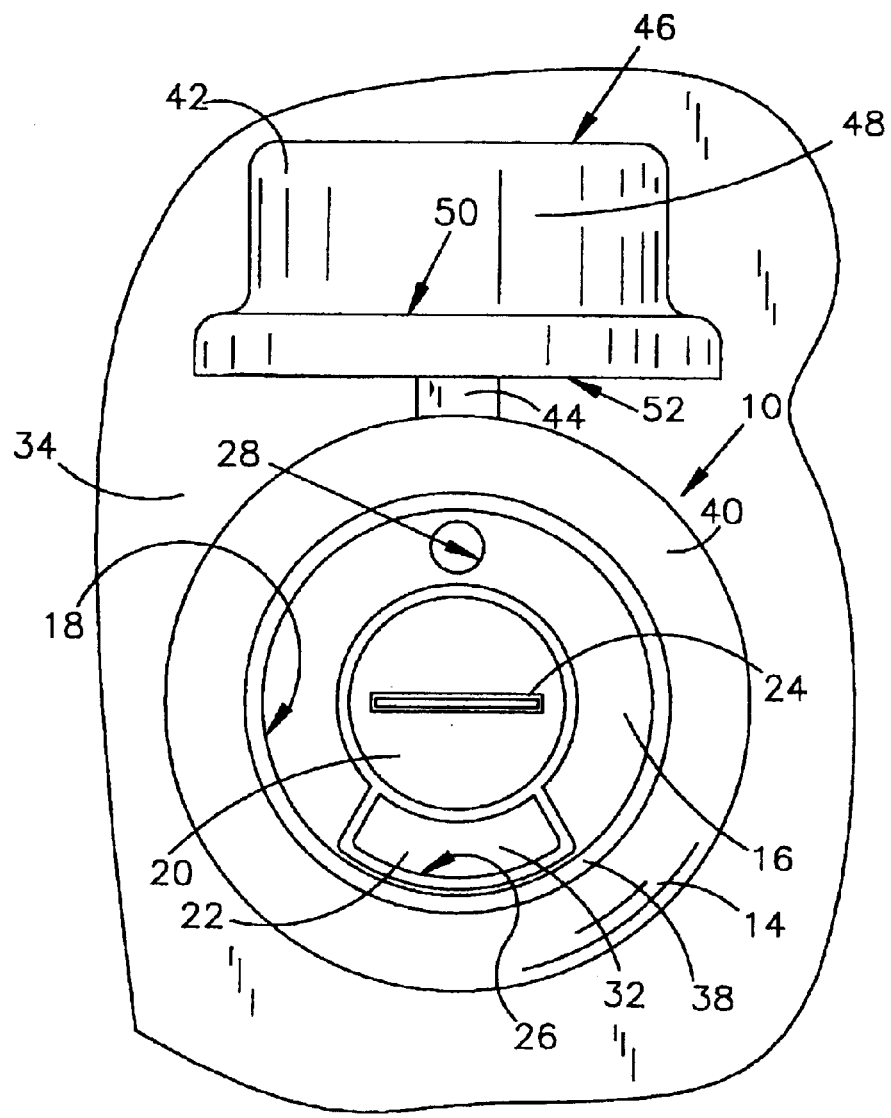
FIG. 2 is a front elevation view similar to FIG. 1 but with the over-cap in a partially opened position, and the insert rotated so that the non-axial openings are non-aligned.

A dispensing cap 10 of the present invention is shown in FIGS. 1 and 2 to include a body 14 having an end wall 16. The end wall 16 includes an axial opening 18 that receives a protruding portion 20 of an insert 22. The protruding portion 20 includes a handle 24. The handle 24 can be variously shaped so long as it permits manual rotation of the insert 22 with respect to the body 14. The body end wall 16 is shown to include two non-axial openings 26 and 28. The opening 26 is generally larger that opening 28. Opening 26 shown in FIG. 1 aligned with an opening 30 through insert end wall 32. When openings 26 and 30 are aligned as shown in FIG. 1, product can be dispensed from a container 34 to which the dispensing cap 10 is attached. The size and shape of the container 34 is not limited by the present invention other than the requirement that the container 34 include a mouth or opening to which the dispensing cap 10 of the present invention can be coupled. The opening 28 is shown in FIG. 1 aligned with two smaller openings 36. The alignment of openings 28 and 36 permit air to enter as product is dispensed.

The end wall 16 includes a channel 38 that lies outside of the non-axial openings 26 and 28 that can capture any drips subsequent to a dispensing operation. The end wall 16 also includes a protruding flange portion 40 that secures the dispensing cap 10 to the container 34. An over-cap 42 is connected to the flange portion 40 by a hinge portion 44. The over-cap 42 includes and end wall 46 surrounded by a tapered sidewall 48. A ring portion 50 flares outward from the sidewall 48 and terminates in a downwardly turned lip 52, which has an interior diameter approximating the outer diameter of the flange portion 40. The hinge portion 44 is integral with the flange portion 40 and the over-cap lip 52.

Figure 3:
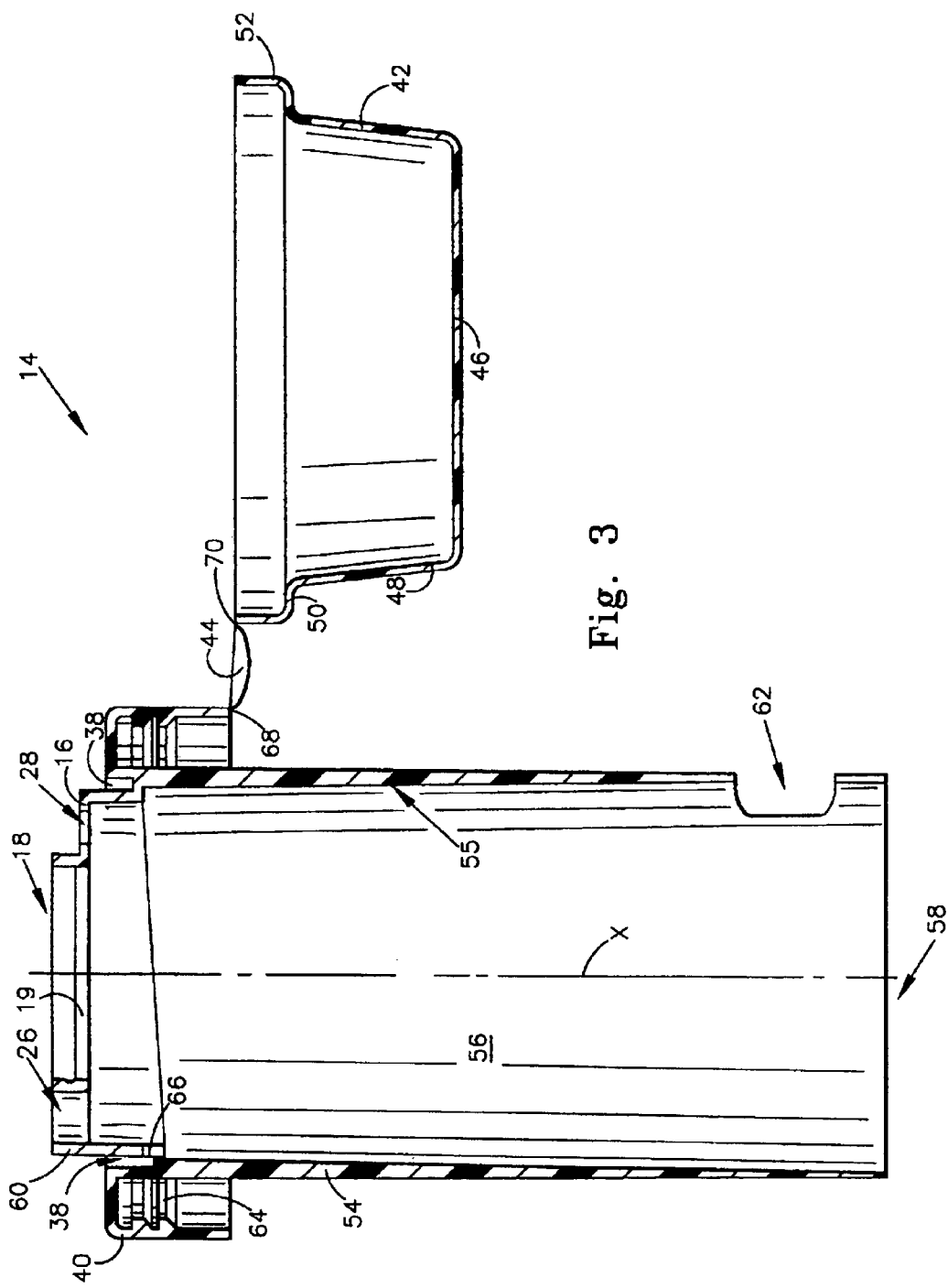
FIG. 3 is a sectional view taken along line 3—3 of FIG. 1 of the body portion of the dispensing cap, with the over-cap shown in an initially molded position.
Figure 4:
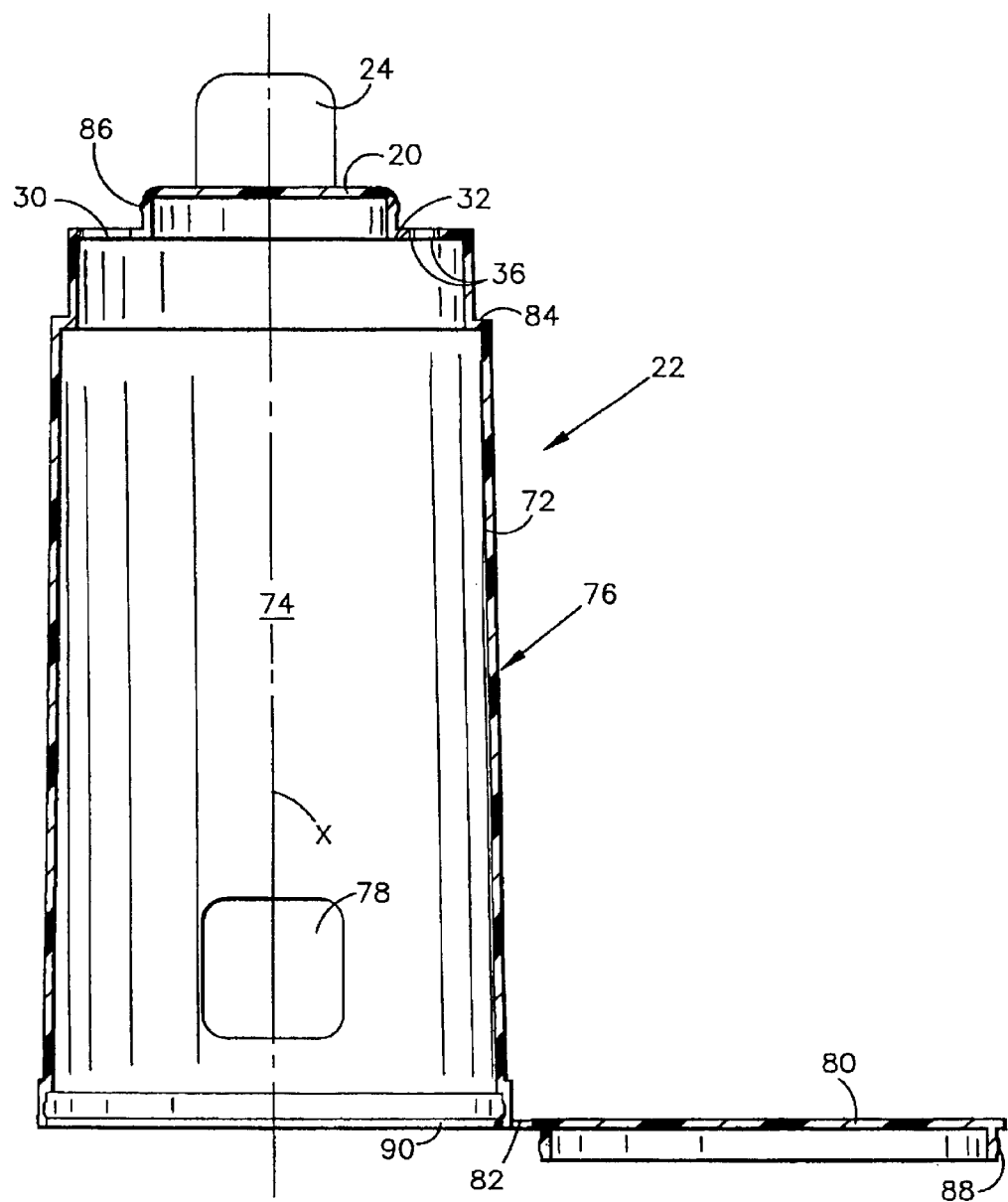
FIG. 4 is a sectional view similar to that of FIG. 3 of the insert portion of the dispensing cap with the second end wall shown in an initially molded position.

The body 14 of the dispensing cap 10 is shown in FIG. 3 in a sectional view taken in the plane of the axis X, which is the axis of rotation of the opening 18. The body 14 is seen to include a sidewall 54 having a slightly tapered cylindrical interior surface 55 defining a cylindrical chamber 56 around the axis X, the chamber 56 having an open first end 58. The body end wall 16 that includes the axial opening 18 and non-axial openings 26 and 28 is integral with the body sidewall 54 and defines a partially closed second end of the chamber 56. The body 14 also includes an aperture 62 in the body sidewall 54 through which material can flow from the container 34 into the chamber 56. The body end wall 16 also has a protruding rim portion 60 that facilitates the pouring of material out of the dispensing opening 26. The flange portion 40 is shown to include coupling elements in the form of an interior screw thread 64 that adapts the body portion 14 for attachment to a mouth of container 34 providing an opening into the interior of the container. The coupling elements 64 can also take the form of a bayonet coupling or similar tang structure for engagement with a suitably formed container mouth. The channel 38 is seen to be slightly inclined, and a small return opening 66 is provided to permit any drips captured by the channel 38 to be returned to the chamber 56. Segments 68 and 70 joining the hinge portion 44 to the flange portion 40 and the over-cap lip 52, respectively, are sufficiently thin as to easily bend so that the over-cap 42 can be easily and repeatedly displaced between the position shown in FIGS. 1 and 3 through the position shown in FIG. 2 to the position shown in FIG. 5, The insert portion 22 of the dispensing cap 10 is shown in FIG. 4 in a sectional view taken in the plane of the axis X, similar to FIG. 3. The insert portion 22 includes a peripheral wall portion 72 defining an interior chamber 74 and including a slightly tapered cylindrical outer surface 76. The first end wall 32 is integral with the peripheral wall portion 72. The first end wall 32 has a protruding portion 20 including a handle 24, which permits manual rotation of the insert 22. The end wall 32 also includes a dispensing opening 30 and a pair of air intake openings 36. The dispensing opening 30 can take any desired shape but is generally no larger that non-axial opening 26 in body portion 14. There can be only a single air intake opening 36, or multiple air intake openings as illustrated, the number and size being dependent on the rate of flow of product desired for the dispensing cap 10.

An aperture 78 is provided in the insert peripheral wall portion 72 leading into the interior chamber 74. A second insert end wall 80 is integrally coupled to the insert peripheral wall portion 72 by thin segment 82 that is sufficiently thin to permit the end wall 80 to be rotated from the original molded position shown in FIG. 4 to a closed position shown in a FIG. 5 so that the end wall 80 is located opposite the insert first end wall 32 closing the interior chamber 74. The insert second end wall 80 includes an outwardly projecting bead 88 that interacts with an inwardly extending ridge 90 at the open end of peripheral wall portion 72 to retain the second end wall 80 in the closed position shown in FIG. 5. The insert peripheral wall portion 72 includes a step 84. The protruding portion 20 of the insert 22 includes an outwardly projecting rim 86 adapted to interact with a corresponding inwardly projecting ridge 19 shown in FIG. 3 to retain the insert portion 22 within the body portion 14 as shown in FIG. 5.

Figure 5:
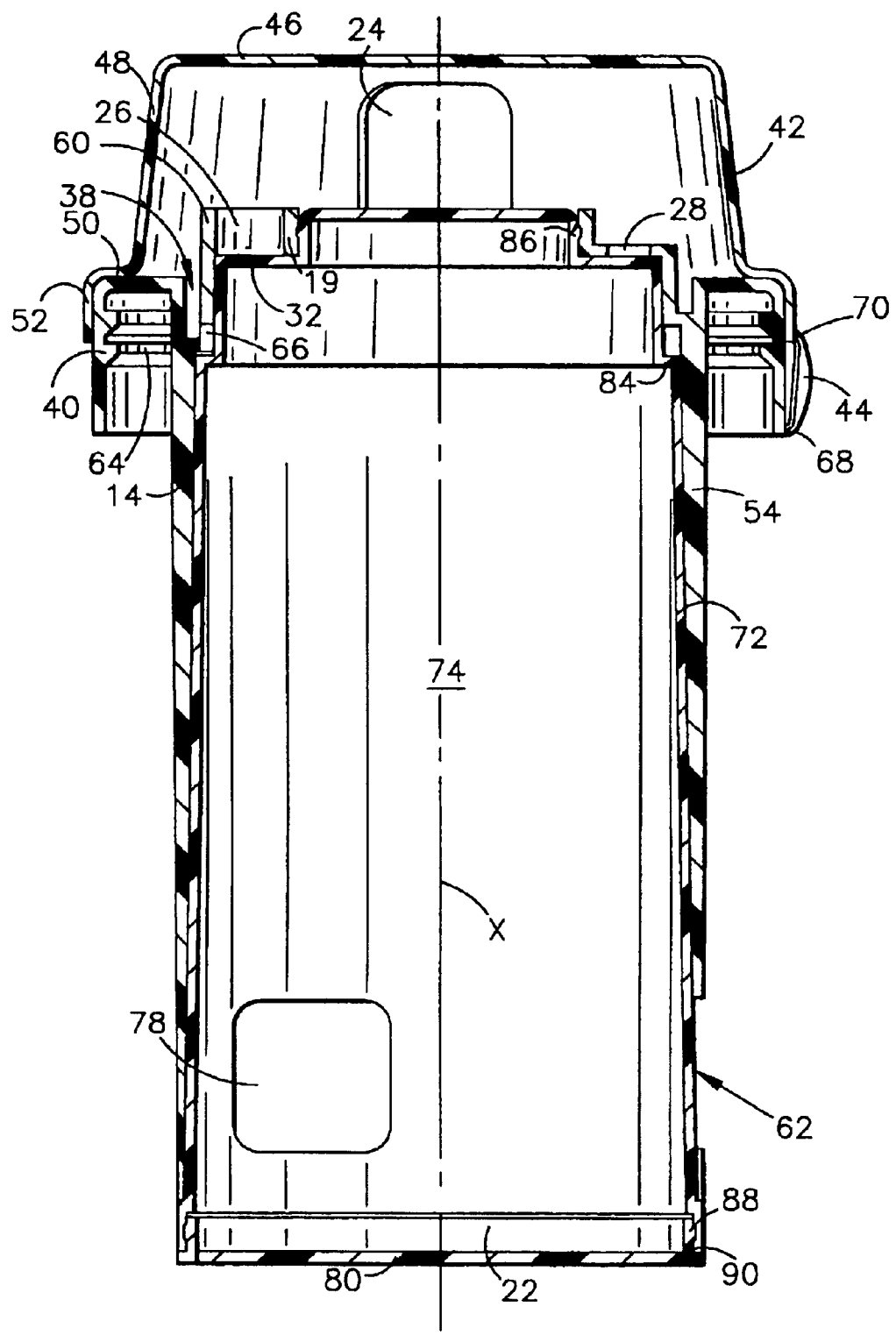
FIG. 5 is a sectional view similar to that of FIGS. 4 and 5 showing the assembled body and insert portions with both the over-cap and insert second end wall shown in a closed position, the insert being rotated with respect to the position shown in FIG. 4.

FIG. 5 is a sectional view, similar to that of FIGS. 4 and 5, showing the insert portion 22 telescopically assembled into the first end 58 of the body portion 14 to a nesting relationship within the body portion 14. Both the over-cap 42 and insert second end wall 80 are shown in a closed position. The inwardly projecting ridge 19 in the axial opening 18 of the body end wall 16 is engaged with the outwardly projecting rim 86 of the insert portion 22 to retain the insert 22 in a fully nested position, yet permit the insert 22 to be rotated within the body portion 16 to effect the filling and dispensing operation of the cap 10. It will be noted that in the position shown, the openings 30 and 36 in end wall 32 of the insert 22 are not aligned with the openings 26 and 28 of the body end wall 16. Additionally, the opening 78 in the insert peripheral wall 72 is not aligned with the opening 62 in the sidewall 54 of the body portion 14. Thus FIG. 5 is illustrative of a storage position for the dispensing cap 10 of the present invention. The rotation of the insert 22 within the body portion 16 is achieved by manually grasping the handle portion 24 on the protruding axial portion 20 of the insert 22.

To dispense material from a container using a dispensing cap 10 of the present invention, the over-cap 42 is displaced from the position show in FIG. 5 at least to the position shown in FIG. 2. In circumstances where the container is located at a position remote form the point of use of the material contents thereof, it may be convenient of the ultimate purchaser to sever the integral over-cap 42 from the flange 40 by cutting or tearing one of the segments 68 or 70 to allow the over-cap 42 to form a convenient conveyance of the material dispensed from the container to the point of use. The insert 22 is then first manually rotated from the position shown in FIG. 5 to the position shown in FIG. 2 wherein the openings 62 and 78 are aligned to permit the interior chamber 74 to be filed with the material to be dispensed. When the desired amount of material is received within the chamber 74, the handle 24 is rotated from the position shown in FIG. 2 through the position shown in FIG. 5 to the position shown in FIG. 1 so that the opening 30 is aligned with opening 26 and the air inlets 36 are aligned with opening 28 to allow the material to flow out of chamber 74 through opening 26. At the conclusion of the dispensing operation, the handle 24 can again be rotated to the storage position shown in FIG. 5.

From the forgoing description of the structure and operation of a preferred embodiment of the present invention, it will be apparent to those skilled in the art that the present invention is susceptible to numerous modifications and embodiments within the ability of those skilled in the art and without exercise of the inventive facility. Accordingly, the scope of the present invention is defined as set forth of the following claims.

What is claimed is:

1. A two-piece cap for dispensing material from a container comprising:
    a body having a sidewall defining a cylindrical chamber having an open first end, an end wall coupled to the body sidewall and defining a partially closed second end of the chamber, the body end wall including an axial opening and a non-axial opening, a protruding flange portion adapted for attachment to a mouth of said container opening into the container interior, the body including an aperture in the housing sidewall; and
    an insert received into the open first end of the cylindrical chamber, the insert having a peripheral wall portion specifically dimensioned to conform to the cylindrical chamber interior surface so as to permit rotation of the insert within the housing, a first insert end wall coupled to the peripheral wall portion and including a protruding portion extending through the axial opening in the body end wall, the first insert end wall also including a non-axial opening positioned for alignment with the body non-axial opening only when the insert is suitably positioned with respect to the body, an aperture in the insert peripheral wall portion for alignment with the body sidewall aperture, and a second insert end wall coupled to the insert peripheral wall portion opposite the insert first insert end wall.

2. The two-piece cap of claim 1 further comprising an over-cap coupled to the body for movement between an open position, permitting material to be dispensed through the body end wall non-axial opening, and a closed position covering the body end wall.

3. The two-piece cap of claim 2 further comprising a hinge coupling the over-cap to the body flange portion.

4. The two-piece cap of claim 1 wherein the flange includes a collar portion having an interior surface including coupling elements for coupling the body to said container opening.

5. The two-piece cap of claim 1 wherein the body end wall includes a peripheral trough inclined with respect to the flange.

6. The two-piece cap of claim 1 wherein the axial opening in the body end wall includes a ridge and the protruding portion of the insert includes a rim engaging the body end wall ridge.

7. The two-piece cap of claim 1 further comprising a hinge portion coupling the second insert end wall to the insert peripheral wall portion.

8. A two-piece cap for dispensing material from a container comprising:
    a body having a sidewall including an aperture and defining a cylindrical chamber having an open first end, an end wall coupled to the body sidewall and defining a partially closed second end of the chamber, the body end wall including an axial opening and a non-axial opening, a protruding flange portion adapted for attachment to a mouth of said container opening into the container interior, and an over-cap coupled to the body for movement between an open position, permitting material to be dispensed through the body end wall non-axial opening, and a closed position covering the body end wall; and
    an insert received into the open first end of the cylindrical chamber, the insert having a compartment defined by a peripheral wall portion specifically dimensioned to conform to the cylindrical chamber interior surface so as to permit rotation of the insert within the chamber, a first insert end wall coupled to the peripheral wall portion and including a protruding portion extending through the axial opening in the body end wall for manual orientation of the insert with respect to the body and a second insert end wall, the insert peripheral wall portion including an aperture into the compartment for alignment with the body sidewall aperture when the insert is positioned at a first position with respect to the body, the insert first end wall also including a non-axial opening from the compartment located for alignment with the body non-axial opening only when the insert is positioned at a second position with respect to the body.

9. The two-piece cap of claim 8 further comprising a hinge coupling the over-cap to the body flange portion.

10. The two-piece cap of claim 8 wherein the flange includes a collar portion having an interior surface including coupling elements for coupling the body to said container opening.

11. The two-piece cap of claim 8 wherein the axial opening in the body end wall includes a ridge and the protruding portion of the insert includes a rim engaging the body end wall ridge.

12. The two-piece cap of claim 8 further comprising a hinge portion coupling the second insert end wall to the insert peripheral wall portion.

13. A body for use in an assembly forming a two-piece cap for dispensing material from a container, the body comprising:

a sidewall including an aperture and defining a cylindrical chamber having an open first end, an end wall coupled to the body sidewall and defining a partially closed second end of the chamber, the body end wall including an axial opening and a non-axial opening, a protruding flange portion adapted for attachment to a mouth of said container opening into the container interior, and an over-cap coupled to the body for movement between an open position, permitting material to be dispensed through the body end wall non-axial opening, and a closed position covering the body end wall.

14. The body of claim 13 further comprising a hinge coupling the over-cap to the body flange portion.

15. The body of claim 13 wherein the flange includes a collar portion having an interior surface including coupling elements for coupling the body to said container opening.

16. The body of claim 13 wherein the axial opening in the body end wall includes an inwardly projecting ridge.

17. An insert for use in an assembly forming a two-piece cap for dispensing material from a container, the insert comprising:

a peripheral wall portion defining an interior chamber and including a cylindrical outer surface, a first insert end wall coupled to the peripheral wall portion and including a protruding axial portion and a non-axial opening out of the interior chamber an aperture in the insert peripheral wall portion leading into the interior chamber, and a second insert end wall coupled to the insert peripheral wall portion opposite the insert first insert end wall for closing the interior chamber.

18. The insert of claim 17 wherein the protruding axial portion includes an outwardly projecting rim.

19. The insert of claim 18 further comprising a hinge portion coupling the insert second end wall to the insert peripheral wall portion.

20. A two-piece cap for dispensing material from a container comprising:

a body having a sidewall including an aperture and defining a cylindrical chamber having an open first end, an end wall coupled to the body sidewall and defining a partially closed second end of the chamber, the body end wall including an axial opening having an inwardly projecting ridge and a non-axial opening, a protruding flange portion including a collar portion having an interior surface with coupling elements for coupling the body to a mouth of said container opening into the container interior, and an over-cap having a hinge coupling the over-cap to the body flange portion for movement between an open position, permitting material to be dispensed through the body end wall non-axial opening, and a closed position covering the body end wall; and an insert received into the open first end of the cylindrical chamber, the insert having a compartment defined by a peripheral wall portion specifically dimensioned to conform to the cylindrical chamber interior surface so as to permit rotation of the insert within the chamber, a first insert end wall coupled to the peripheral wall portion and including a protruding portion extending through the axial opening in the body end wall for manual orientation of the insert with respect to the body and a second insert end wall, the protruding portion of the insert including an outwardly projecting rim engaging the body end wall ridge, the insert peripheral wall portion including an aperture into the compartment for alignment with the body sidewall aperture when the insert is positioned at a first position with respect to the body, the insert first end wall also including a non-axial opening from the compartment located for alignment with the body non-axial opening only when the insert is positioned at a second position with respect to the body.

* * * * *